(12) United States Patent
Saitou et al.

(10) Patent No.: US 6,232,741 B1
(45) Date of Patent: May 15, 2001

(54) RELUCTANCE TYPE MOTOR APPARATUS AND DRIVING METHOD CAPABLE OF REDUCING RIPPLES IN MOTOR OUTPUT TORQUE

(75) Inventors: Tomohiro Saitou, Kariya; Hideji Yoshida, Hashima; Shinji Makita, Kariya; Naohisa Mimura; Yoshiyuki Takabe, both of Hamamatsu, all of (JP)

(73) Assignees: Denso Corporation, Kariya; ASMO Co., Ltd., Kosai, both of (JP)

( * ) Notice: Subject to any disclaimer, the term of this patent is extended or adjusted under 35 U.S.C. 154(b) by 0 days.

(21) Appl. No.: 09/413,884

(22) Filed: Oct. 7, 1999

(30) Foreign Application Priority Data

Oct. 12, 1998 (JP) .................................. 10-289592

(51) Int. Cl.$^7$ ........................................ H02P 7/05
(52) U.S. Cl. ...................... 318/701; 318/254; 318/432; 318/721
(58) Field of Search .................... 318/138, 254, 318/439, 700, 701, 721, 724, 685, 696, 432, 433

(56) References Cited

U.S. PATENT DOCUMENTS

| | | | |
|---|---|---|---|
| 4,143,308 | * 3/1979 | Deplante et al. | ............ 318/138 |
| 5,138,244 | * 8/1992 | Bahn | ............ 318/701 |
| 5,424,624 | * 6/1995 | Senak, Jr. | ............ 318/701 |
| 5,621,294 | 4/1997 | Bessette et al. . | |
| 5,627,445 | * 5/1997 | Webster | ............ 318/701 |
| 5,663,625 | 9/1997 | Sato et al. . | |
| 6,014,001 | * 1/2000 | Guinet | ............ 318/701 |
| 6,014,002 | * 1/2000 | Guinet | ............ 318/701 |

FOREIGN PATENT DOCUMENTS 2-285991  11/1990 (JP) .
8-126273   5/1996 (JP) .

* cited by examiner

*Primary Examiner*—Bentsu Ro
(74) *Attorney, Agent, or Firm*—Pillsbury Winthrop LLP

(57) ABSTRACT

A reluctance type motor apparatus comprises switching devices for energizing phase coils of a motor, diodes for circulating discharge currents of the phase coils, a current sensor for detecting a sum of currents flowing in the phase coils, and a control circuit for controlling energization of the phase coils so that the detected sum of the currents equal a predetermined reference current. The current sensor is positioned between the phase coils and junctions between the phase coils and the diodes. Phase currents supplied to energize the phase coils are varied in dependence on the rotational position of the rotor so that the output torque of the motor does not include ripple.

8 Claims, 6 Drawing Sheets

RELUCTANCE TYPE MOTOR APPARATUS AND DRIVING METHOD CAPABLE OF REDUCING RIPPLES IN MOTOR OUTPUT TORQUE

CROSS REFERENCE TO RELATED APPLICATION

This application relates to and incorporates herein by reference Japanese Patent Application No. 10-289592 filed on Oct. 12, 1998.

BACKGROUND OF THE INVENTION

1. Field of the Invention

The present invention relates to a multi-phase half-wave energization reluctance type electrical motor apparatus and a driving method therefor.

2. Related Art

A multi-phase reluctance type motor generally has a rotor and a stator wound with phase coils. It is simple in construction and capable of producing a large output torque. However, it is not suited for high speed rotation. Further, its output torque includes relatively large ripples. Thus, its application is limited to specified fields.

JP-A-8-126273 proposes one method of reducing ripples in the output torque by detecting the electric current flowing in each phase coil and shaping the electrical current flowing in each phase coil. However, this method requires a processing circuit for shaping the waveform of current flowing in each phase coil and a current sensor for detecting the current flowing in each phase coil.

SUMMARY OF THE INVENTION

It is therefore an object of the present invention to provide a reluctance type motor, a driving circuit and a driving method therefor, which are capable of reducing ripples of output torque in a simple construction.

According to the present invention, a sum of electrical currents flowing in multi-phase coils is regulated to a predetermined reference value without detecting each phase current separately. The sum of the currents is detected by a current sensor provided at the side of coils than at junctions between switching devices and discharge current circulating diodes.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
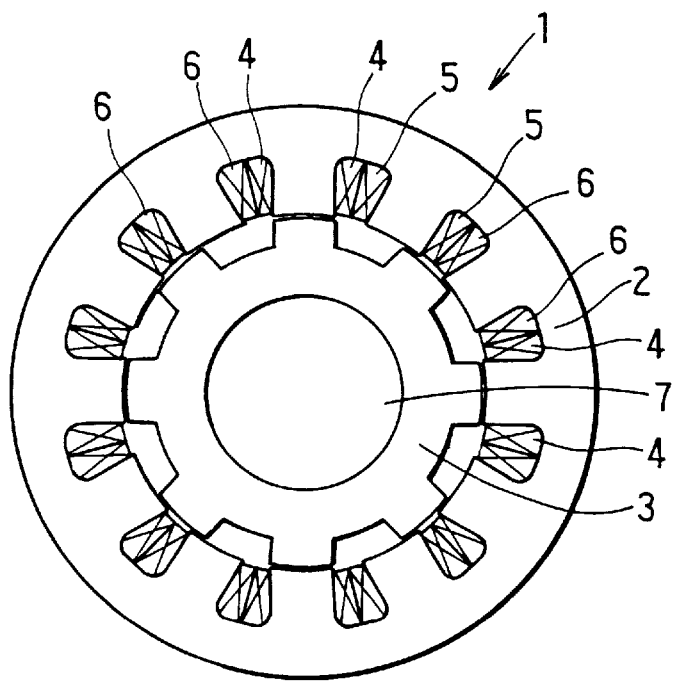
FIG. 1 is an axial front view of a reluctance type motor according to an embodiment of the present invention.
Figure 8:
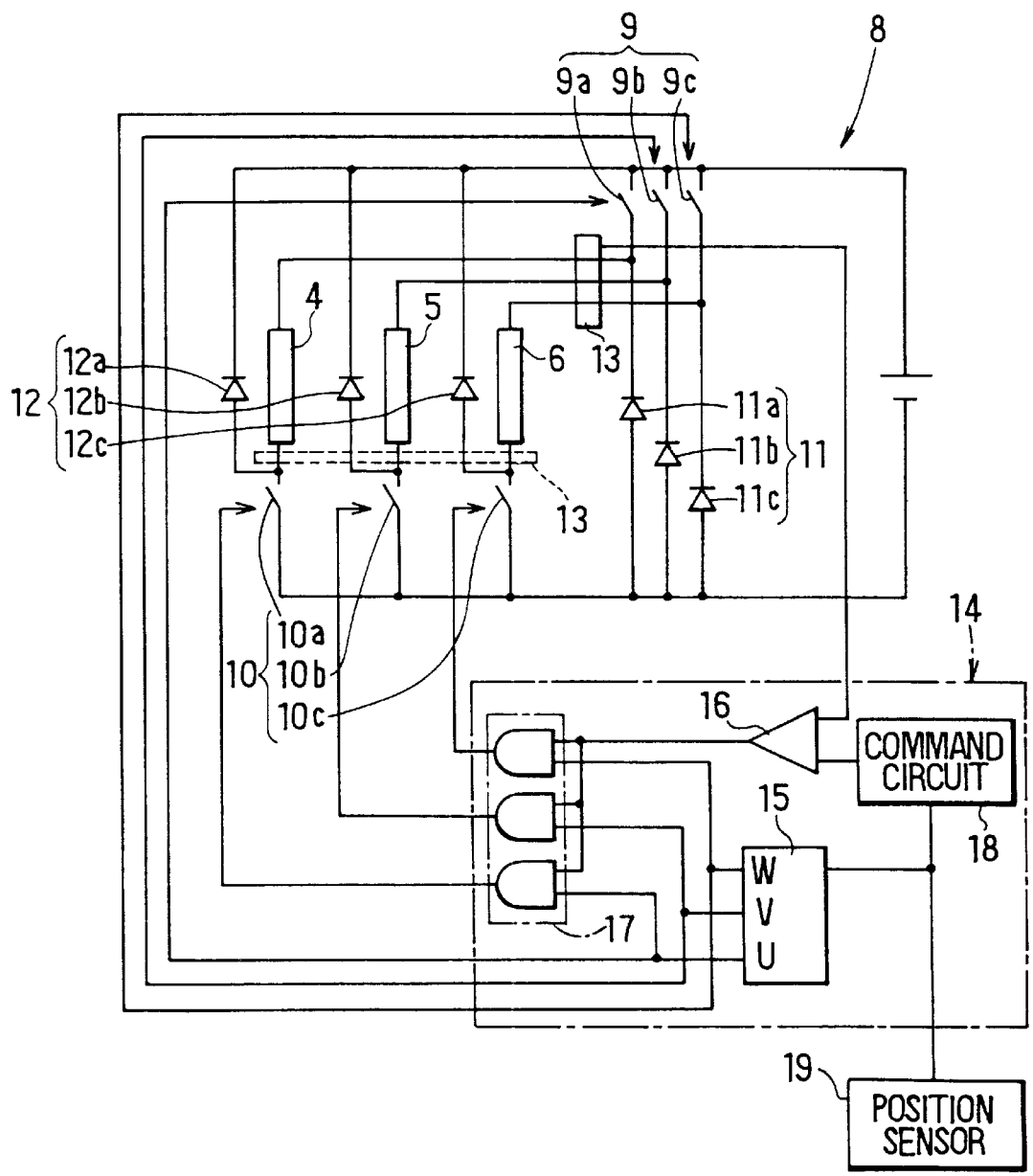
FIG. 8 is an electrical circuit diagram of a driver circuit.

Referring first to FIG. 1, a reluctance type electrical motor 1 comprises a stator 2 made of a magnetic material, a rotor 3 made of a magnetic material, three phase coils 4, 5, 6, a rotary shaft 7 and the like. The rotor 3 is fixedly mounted on the shaft 7 and held coaxially with and rotatably in the stator 2. The coils 4, 5, 6 are wound on the stator 2 for three phases U, V, W, respectively, and connected as shown in FIG. 8.

Figure 2:
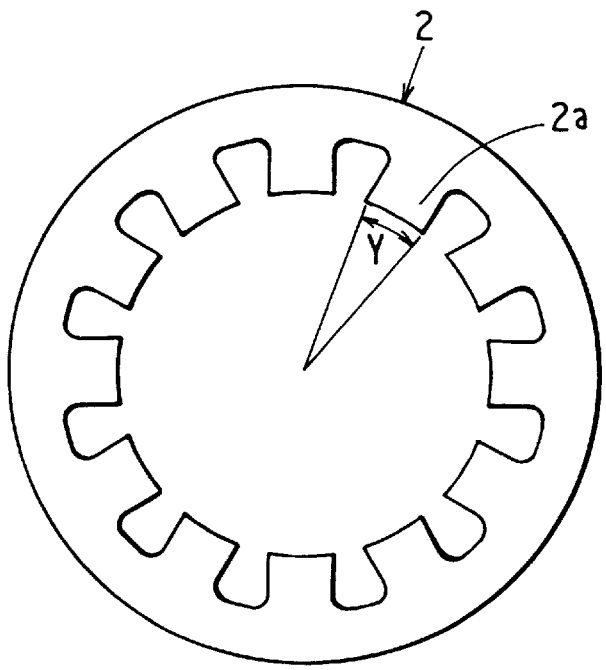
FIG. 2 is an axial front view of a stator of the motor shown in FIG. 1.

The stator 2 has, as shown in FIG. 2, twelve protrusions (teeth) 2a arranged equi-angularly, that is, every 30 degrees, on its inner periphery. Each protrusion 2a protrudes in a radially inward direction, that is, towards the rotor 3. The three coils 4, 5, 6 are wound on the corresponding protrusions 2a alternately and disposed in slots provided between adjacent two of the protrusions 2a. Each protrusion 2a has a circumferential width defined as an angle Y with respect to the axial center of the motor 1.

Figure 3:
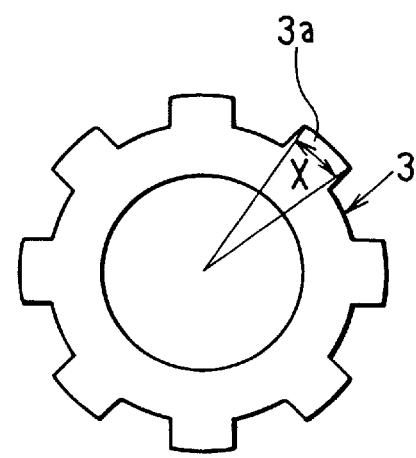
FIG. 3 is an axial front view of a rotor of the motor shown in FIG. 1.

The rotor 3 has, as shown in FIG. 3, eight protrusions (teeth) 3a are arranged equi-angularly, that is, every 45 degrees, on its outer periphery. Each protrusion 3a protrudes in a radially outward direction, that is, towards the stator 2. Each protrusion 3a has a circumferential width defined as an angle X with respect to the axial center of the motor 1.

Figure 4:
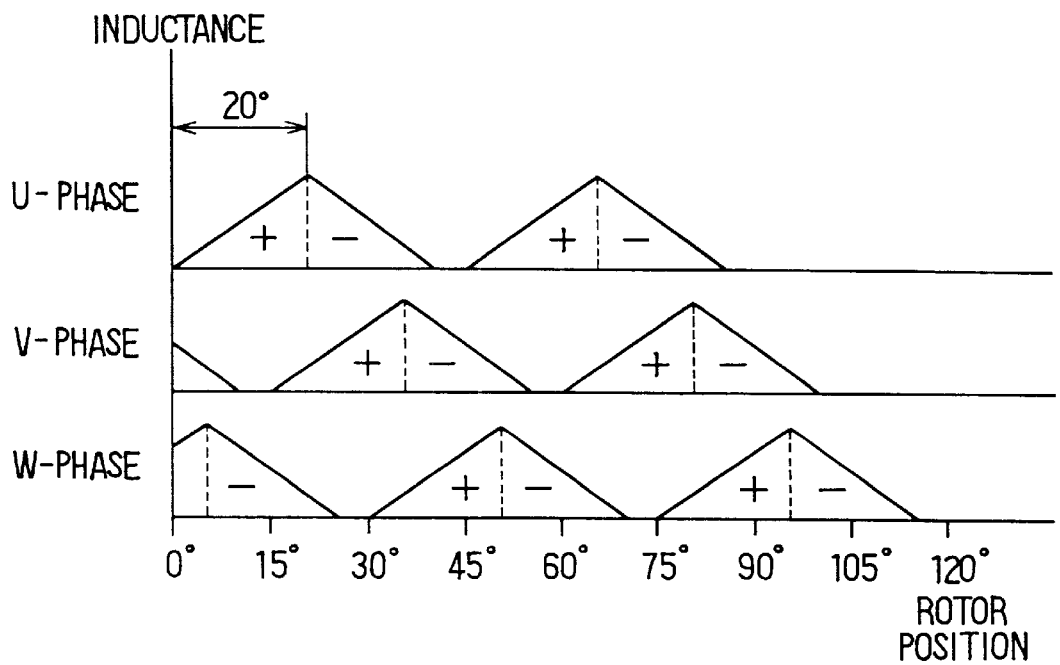
FIG. 4 is a characteristics diagram showing a relation between a rotor position and an inductance of each phase.
Figure 5:
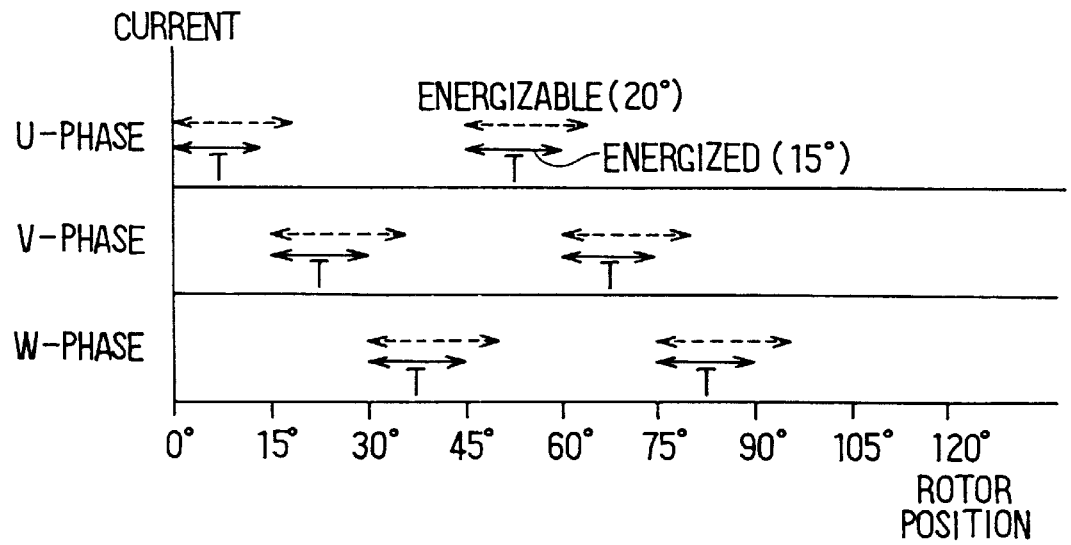
FIG. 5 is a diagram showing an energizable range and energized range of each phase coil relative to a rotor position.

The motor 1 has an inductance (L) characteristics relative to the rotor position defined in angles as shown in FIG. 4. The inductance varies in the positive direction over a 20 degrees angular interval of a rotor rotation. The output torque produced by the motor 1 is positive and negative when the coils 4, 5, 6 are energized in a positive range and a negative range of the slope of the inductance characteristics, respectively. Therefore, as shown in FIG. 5, the electrical current is supplied to the coils 4, 5, 6 for only a 15 degrees angular interval (solid line) T of rotor rotation within the 20 degrees angular interval (dotted line) to cause the motor 1 to continuously produce a positive torque. The 20 degrees angular interval indicates an angular range in which each coil is energizable. The magnitude of the current is regulated in correspondence with a required output torque.

Figure 6:
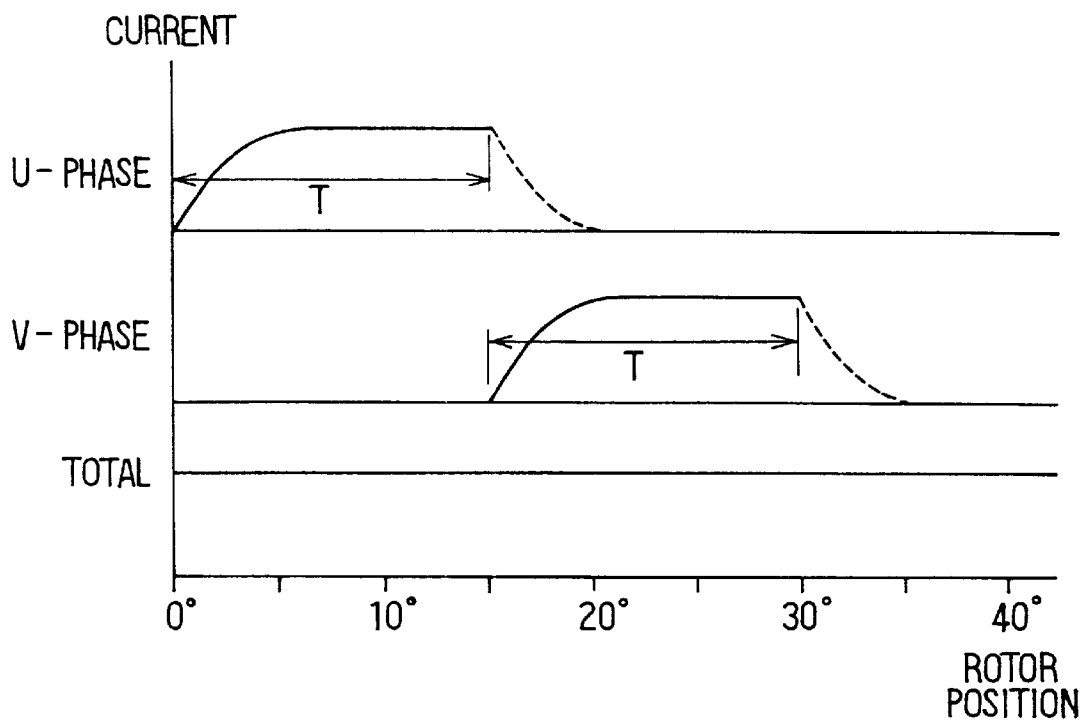
FIG. 6 is waveform diagram showing currents of U-phase and V-phase relative to a rotor position.

Even if the current to each coil is supplied only over the 15 degrees angular interval T as shown by a solid line in FIG. 6, the current continues to flow in the coil as a discharge current due to a discharge of energy stored in the coil as shown by a dotted line in FIG. 6. Specifically, the discharge current also produces the positive and negative output torque, when it is in the positive and negative slope range of the inductance characteristics, respectively. The discharge current which continues to flow in the negative torque range will result in large ripples in the output torque of the motor 1. Therefore, it is desired to ensure the angular range of the positive slope inductance characteristics as wide as possible, so that the motor 1 continuously produces the positive torque without ripples in the output torque.

It is preferred for this reason that the rotor protrusion angle X and the stator protrusion angle Y satisfy the following relation in which N indicates the number of rotor protrusions 3a and P indicates the number of phases.

X, Y>360°÷N÷P

In this embodiment, X and Y are set to be more than 15 degrees because N and P are 8 and 3 in the above relation, respectively.

Figure 7:
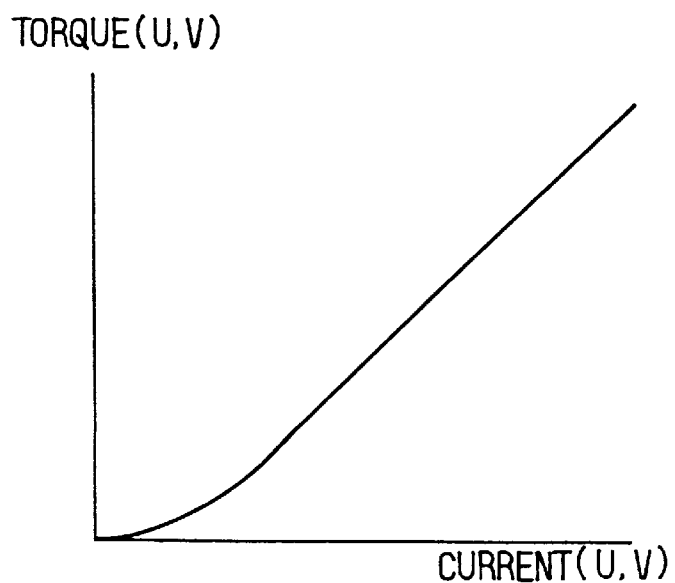
FIG. 7 is a graph showing a relation between a coil current and an output torque.

Further, the output torque of the motor 1 changes in response to the magnitude of the current flowing in the coils 4, 5, 6 as shown in FIG. 7. Specifically, the output torque increases in proportion to the square of the current as long as the current is comparatively low, but increases in proportion to the current over a range above the comparatively low current. Therefore, as shown in FIG. 6, it is preferred to control the sum of the currents flowing in two phases, for instance, U-phase and V-phase, between which the coil energization is switched so that the output torque characteristics continuously becomes flat. That is, the sum of the U-phase current (discharge current) flowing at the time of interrupting the energization of the U-phase coil and the V-phase current flowing at the time of starting the energization of the V-phase coil is regulated to a command current. The same current control is effected at the time of the switching between the V-phase and W-phase and the switching between the W-phase and the U-phase.

A motor driver circuit unit 8 is constructed as shown in FIG. 8. In the driver circuit unit 8, semiconductor switching devices 9 (9a, 9b, 9c) and 10 (10a, 10b, 10c) are provided for turning on and off the corresponding coils 4, 5, 6. Diodes 11 (11a, 11b, 11c) and 12 (12a, 12b, 12c) are provided for circulating the coil stored energy at the time of terminating the coil energization. A single current sensor 13 is provided for detecting the sum of the currents flowing in the coils 4, 5, 6. Specifically, the current sensor 13 is provided between one sides of the coils 4, 5, 6 and the junctions between the switching devices 9 and the diodes 11. Alternatively, the current sensor 13 may be provided between the other sides of the coils 4, 5, 6 and the junctions between the switching devices 13 and the diodes 12 as shown by a dotted line in the figure. A control circuit 14 is also provided to control the turning on and off of the switching devices 9 and 10 and the magnitude of each current supplied to the coils 4, 5, 6.

Figure 10:
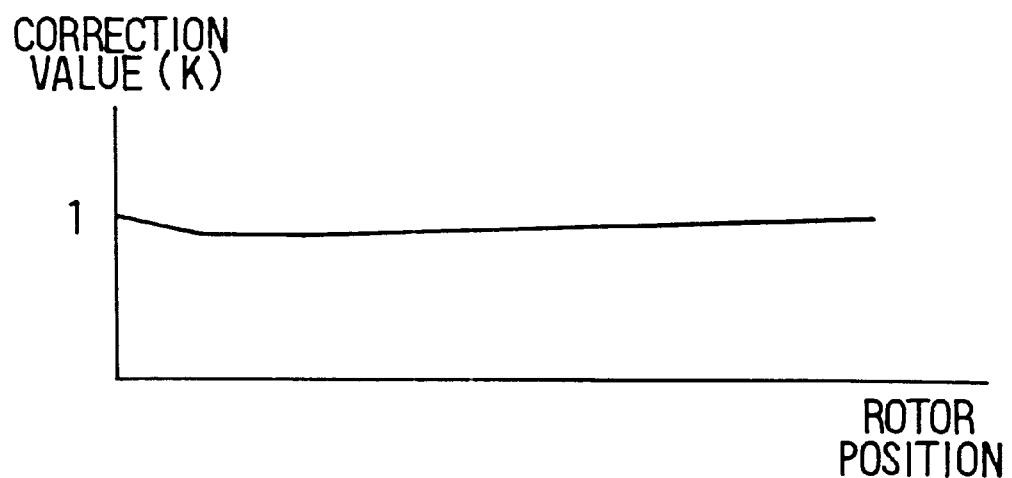
FIG. 10 is a graph showing a relation between a rotor position and a mapped value for phase current correction.

In the control circuit 14, an energization phase determination circuit 15 is provided for receiving a rotor position signal from a rotor position sensor 19 to determine the phase which is to be energized and for turning on and off the switching devices 9 connected to one sides of the coils 4, 5, 6 based on the determined phase. A current feedback circuit 16 is provided for feedback controlling the phase currents so that the detected sum of the currents is equalized to a command current Ic produced from a command circuit 18. An AND circuit 17 is provided for turning on and off the switching devices 10 connected to the other sides of the coils 4, 5, 6 based on the logic product (AND) of the output signal of the feedback circuit 16 and the output signals of the phase determination circuit 15. The command current applied to the feedback circuit 16 is corrected with a mapped data K shown in FIG. 10 when the command current is above a predetermined value.

Figure 9:
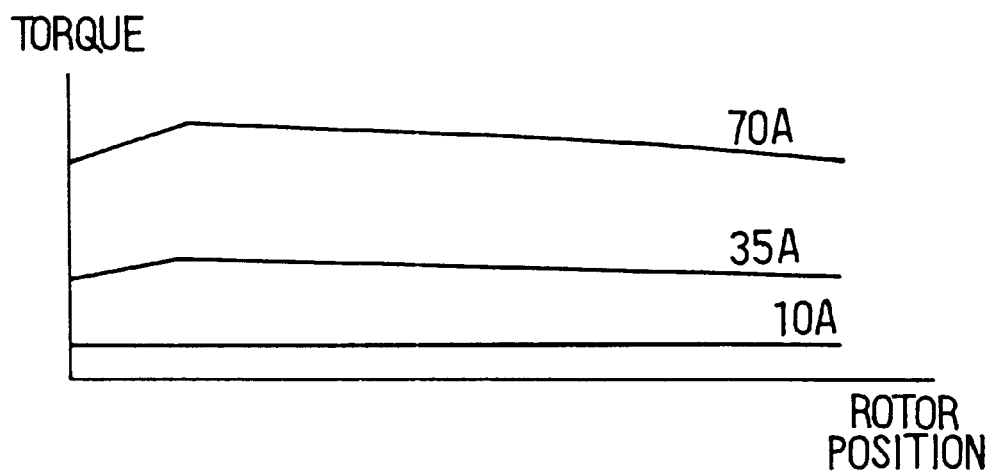
FIG. 9 is a characteristics diagram showing an output torque relative to a rotor position.

Specifically, as shown in FIG. 9, ripples do not occur in the output torque as long as the current flowing in each coil is low, for instance, 10 amperes, because the magnetic saturation does not arise. However, ripples occur as the current increases to higher levels, for instance, 35 amperes and 70 amperes. The average torque and the ripple waveform generally change in proportion to the current. Therefore, it is preferred to correct the command current Ic in a range in which the magnetic saturation tends to occur, so that the flat output torque characteristics is provided. For this reason, according to the embodiment, a command average current Iav is multiplied by the mapped value K (FIG. 10), which is an inverted value of a division of the torque value relative to the rotor position by the average torque.

Figure 11:
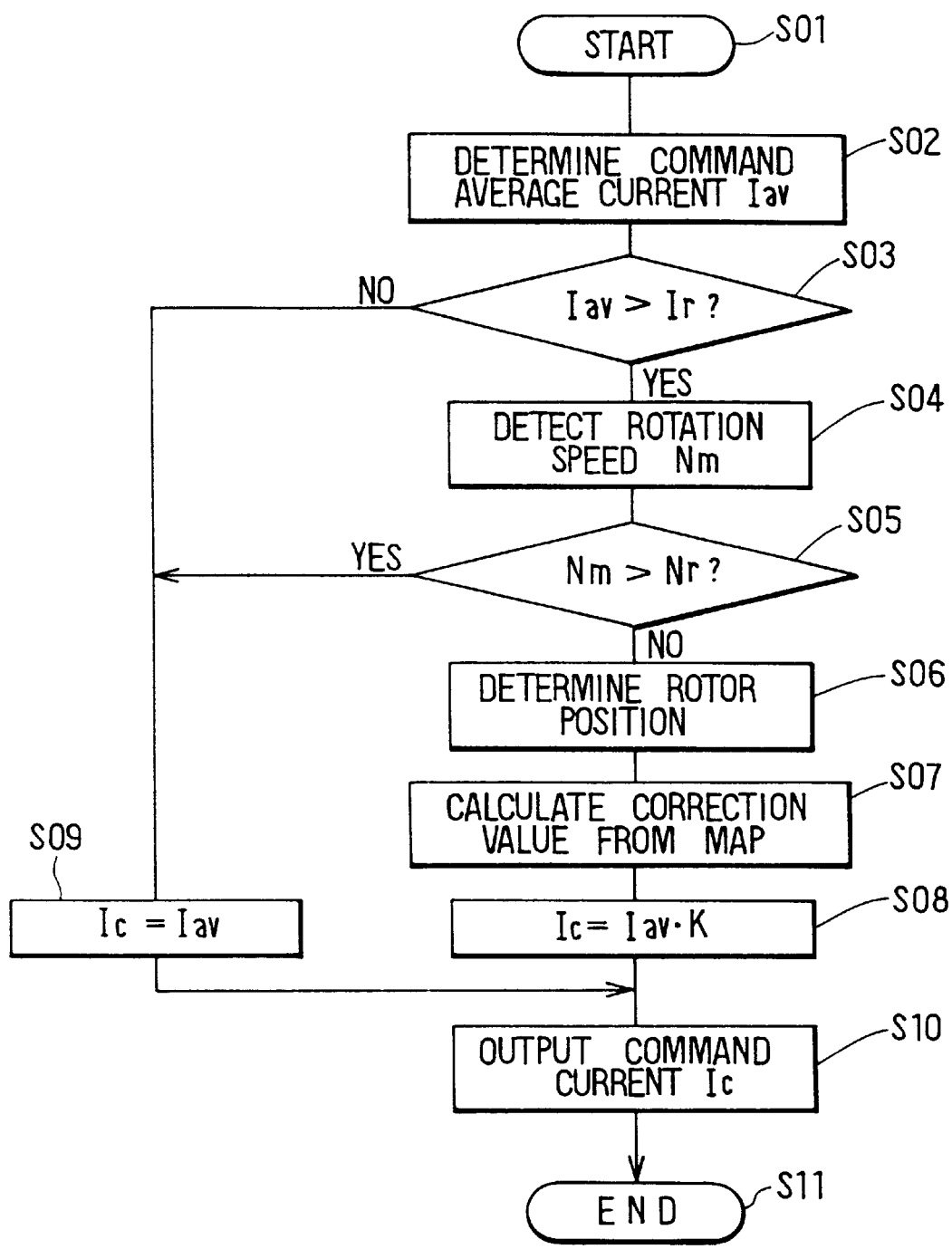
FIG. 11 is a flow diagram of a control routine executed by a command circuit shown in FIG. 8.

The command circuit 18 which may be a microcomputer is programmed to execute a routine shown in FIG. 11.

The routine is initiated at step S01 every predetermined time interval, a command average current Iav is determined as a base current in correspondence with the required output torque at step S02. The command average current Iav is compared with a predetermined reference current Ir at step S03. If the current Iav is higher than the reference current Ir (YES), the rotational speed Nm of the motor 1 is detected at step S04. The speed Nm may be detected from the output signal of the rotor position sensor 19.

Next, the detected speed Nm is compared with a predetermined reference speed Nr at step S05. If the detected speed Nm is lower than the reference speed Nr (NO), the rotor position is determined from the output signal of the rotor position sensor 19. The correction value K (FIG. 10) relative to the determined rotor position is calculated by mapped data retrieval at step S07. The final command current Ic is calculated as a coil drive current by multiplying the correction value K with the command average current Iav determined at step S02.

On the other hand, if the command average current Iav is smaller than the reference current Ir (NO at step S03) or the detected speed Nm is higher than the reference speed Nr (YES at step S05), the command average current Iav is set as the command current Ic at step S09. Thus, no correction is made at step S09, as long as the command average current Iav is low, for instance, 10 amperes because of low required output torque, or as long as the rotational speed Nm is high where the ripple is nominal due to inertia. Finally, the command current Ic calculated at step S08 or S09 is output to the feedback circuit 16, thus ending the routine.

According to the above embodiment, the current sensor 13 is provided at a position where the sum of the phase currents (energization currents and discharge currents) flowing in the coils 4, 5, 6 can be detected irrespective of the turning on and off of the switching devices 9 and 10. Thus, the number of current sensors is reduced and the circuit construction of the driver circuit unit 8 is simplified.

Further, the angles X and Y of the stator protrusion 2a and rotor protrusion 3a are determined to satisfy the above relation. As a result, the range of positive inductance characteristics can be extended relative to the coil energization angular interval (15 degrees) required for ensuring the continuously flat output torque characteristics.

The command current Ic is calculated only once at step S08 in each execution of the routine of FIG. 11. As a result, processing time of the command circuit 18 can be shortened, and hence the motor 1 is enabled to rotate at higher speeds. It is to be noted that the command current Ic may also be calculated at step S09 by using another correction value different from the one used in step S08.

The present invention should not be limited to the disclosed embodiment and its modifications, but may be implemented in many other ways without departing from the spirit of the invention.

What is claimed is:

1. An apparatus for a reluctance type motor having a stator, a rotor and multi-phase coils, the apparatus comprising:
   current detecting means for detecting a sum of currents flowing in the coils; and
   current control means for controlling the currents so that the detected sum of the currents equals a command current, wherein the command current is determined based on a base current and a correction value which varies with a rotational position of the rotor.

2. An apparatus of claim 1, wherein:

the current detecting means includes a single current sensor provided solely for detecting the sum of the currents; and the current control means includes switching devices connected in series with the coils for energizing the coils, respectively, and diodes connected in a discharge current circulation paths for circulating the currents arising from discharging of the coils at the time of termination of the energization of the coils, respectively.

3. An apparatus of claim 2, wherein:

the current sensor is provided at a coil side with respect to junctions between the switching devices and the diodes.

4. An apparatus of claim 1, wherein:

the rotor has rotor protrusions in the number of N, each rotor protrusion having an angular interval X;

the stator has stator protrusions for the coils which are wound in P phases, each stator protrusion having an angular interval Y; and each of the angular intervals X and Y is set to be larger than $360°\div N\div P$.

5. A control method for a reluctance motor having a stator, a rotor and phase coils, the method comprising the steps of:

determining a base current for the phase coils;

detecting a rotational position of the rotor;

determining a correction value variably with the detected rotational position;

correcting the base current by the correction value; and supplying the corrected current to the phase coils.

6. A method of claim 5, wherein:

the correcting step is disabled when the base current is lower than a predetermined reference current.

7. A method of claim 5, wherein:

the correcting step is disabled when a rotational speed of the rotor is higher than a predetermined reference speed.

8. A method of claim 5, further comprising:

detecting a sum of currents flowing in the phase coils irrespective of energization and deenergization of the phase coils; and controlling the currents supplied to the phase coils in response to the detected sum of the currents.

* * * * *